United States Patent [19]

Harr

[11] 4,088,033

[45] May 9, 1978

[54] PISTON POWER GENERATING MACHINE

[76] Inventor: Ewald Harr, Heilbronner Strasse 19, Schwaigern 2, Germany, 7103

[21] Appl. No.: 712,644

[22] Filed: Aug. 9, 1976

[30] Foreign Application Priority Data

Aug. 9, 1975 Germany ............................ 2535644

[51] Int. Cl.[2] ............................................. F16H 21/16

[52] U.S. Cl. ......................................... 74/25; 74/42; 123/45 R

[58] Field of Search ........... 123/45 R, 18, 197, 61–63; 74/42, 25

[56] References Cited

U.S. PATENT DOCUMENTS

| | | | |
|---|---|---|---|
| 1,363,077 | 12/1920 | Argall | 123/18 |
| 1,813,259 | 7/1931 | Schick | 123/45 R |
| 3,824,970 | 7/1974 | Amery | 123/45 R |

*Primary Examiner*—Benjamin W. Wyche
*Assistant Examiner*—Wesley S. Ratliff, Jr.
*Attorney, Agent, or Firm*—Wigman & Cohen

[57] ABSTRACT

A piston-type power generating machine, useful as a prime mover, internal combustion engine, pump or the like, is disclosed wherein a piston having an eccentric center of gravity with respect to its longitudinal axis is reciprocatingly guided in a cylindrical working chamber of a machine housing. The piston is connected to output conversion gears through guide slots by means of output members which penetrate the housing and which impart a rotational movement to the piston about its longitudinal axis.

14 Claims, 7 Drawing Figures

PISTON POWER GENERATING MACHINE

BACKGROUND OF THE INVENTION

The invention concerns a piston-type power generating maching with a housing containing one or several cylinder-shaped working spaces and with at least one piston moving back and forth parallel to its longitudinal axis in the working spaces, which is connected with a conversion gear by elements penetrating the housing. The known stroked piston machines exhibiting these characteristics, despite their universal use, still have the disadvantage of the back and forth moving piston mass which must be supported in its several points, which results in heavy loads on the entire machine, especially on the crankshaft and its bearings. This disadvantage of the stroking piston machine does not exist in the case of the rotary piston machine, since no back and forth moving gear drive masses are present, however, the known rotary piston or rotating combustion machines have disadvantages which are not present in stroked piston machines. The difficulties of adequate sealing between the rotary piston and the working cylinder wall as well as the cooling of the cylinder in the case of internal combustion engines should be mentioned.

SUMMARY AND OBJECTS OF THE INVENTION

The task of the present invention is to provide a piston-type power generating machine which, while avoiding the existing disadvantages of the known solutions, combines the advantages of the stroke piston machine such as simple sealing of the working space, good cooling and lubrication possibilities, a favorable shape of the working space as well as moderate manufacturing cost due to simple geometrical shapes with the advantages of the rotary piston machines such as vibration-free running, favorable overall installation space in relation to the working space, no friction of the piston in the housing and a simple control. According to the invention this is essentially achieved by the piston having an eccentric center of gravity as well as by rotating in the working space and being connected directly or indirectly with slaving guides, which lend a rotary motion to it around its longitudinal axis with its back and forth movement in the direction of the longitudinal axis. In this manner, the back and forth movement of the piston can be directly converted into a rotary movement or vice versa, by means of which the advantages of a rotary piston engine can be obtained with this back and forth moving piston, without the disadvantages existing in the case of a rotary piston engine compared with a stroked piston machine.

It has proved to be advantageous to guide the piston by means of one or several drive elements penetrating the housing of the working space toward the outside. By means of this uniting of the control which imparts the rotational movement to the piston with the output of the mechanical energy in the moved piston, a very simple design of the piston-force and operating engine according to the invention is obtained.

In a preferred design example, piston arms extending preferably radially opposite from the piston, engage into slotted guides of the cylinder housing. This design of the invention is characterized by an excellent guiding of the piston with an eccentric center of gravity. A motion of the piston leading to trouble and to premature wear can thus be eliminated. With at least three piston arms, contacting of the piston on the cylinder wall, subject to bearing wear, is eliminated. According to the construction of the drive, the guide can be designed in such a way that the piston receives either a pendulous movement in the direction of rotation or a circular rotational movement. In the first case, the guide slots have, relative to a plane, a circular or an elliptical shape, whereby their dimensions in the direction of the longitudinal axis correspond to the maximum displacement of the piston. In the other case, the guide slots can be advantageously shaped in the form of a wave line extending over the entire circumference of the cylinder housing with a whole multiple of a wave train, whereby its amplitude corresponds to the displacement of the piston. These solutions have the advantage that a single piston can be arranged within the cylinder housing and can be acted upon from both front ends. Thus a doubly effective piston is obtained without additional constructional expenditure.

With this embodiment, it is also recommended to eccentrically connect the piston arms with the drive elements mounted on the outside of the working cylinder housing, which are arranged on a rotational axis lying in a transverse central line of the piston stroke path. The combined longitudinal and rotational movement of the piston can thus be transmitted outwardly to a gear without the interposition of other intermediate members. The drive elements can be designed directly as drive gears, preferably as drive gear wheels, in which the piston arms are guided in a longitudinally sliding manner. Alternatively, the piston arms can also be pivoted on swash elements such as swash plates, which are swivelingly mounted on drive shafts projecting radially outside of the cylinder housing in a transverse central line of the piston stroke path. Both drive alternatives can be used optionally according to the prevailing conditions. The swash plates can be designed in such a way that they counteract the centrifugal forces of the piston mass.

To assure a quiet, essentially vibration-free running of the piston engine, it is recommended, with the mentioned output possibilities, to connect the output elements with a common central gear wheel. The output gears and the common central gear wheel can be designed as bevel gearing. But it is also possible to arrange the output gears on a spoke-shaped part of the central gear wheel mounted swivelingly around the longitudinal central axis of the piston, and to hold them thereby on a stationary wheel in a rolling manner. The central gear wheel can hereby be guided with bearing box-like projections at the cylinder housing or at the piston exposed between the working spaces.

In an alternative construction, it is also possible to connect the piston by means of a pivotable connection directly with a drive wheel which is movably mounted at an angle of, for example 45°, in guides opposite the piston stroke axis. This solution has the advantage of requiring minimal space and a simple mounting consisting of only a few individual parts. Counterweights can be installed in the drive wheel itself counteracting the centrifugal forces of the piston.

If required, a number of separate working spaces arranged successively can each be provided with a piston element, whereby the individual piston elements are jointed through the cylinder walls by piston rods working in the direction of the stroke, which in their turn are connected with the output elements. With this solution, the whole working space volume can be divided into a number of individual cylinders, whereby the piston elements arranged in the individual cylinders can be united with a single drive.

It has also proved to be advantageous to construct the piston of a shaft element extending next to the longitudinal central axis and the piston heads adapted to the cylinder cross-section and originating from both ends of this shaft elements, by means of which the center of gravity of the piston is shifted in a simple manner away from the longitudinal central axis. In this case, to achieve a favorable mass distribution for static reasons the piston can be provided with a conically narrowed central part extending from the side of the shaft, preferably in the area of its transverse central line. In this area, the piston is provided with a ring fitted in the cylinder which contributes to perfect guiding of the piston. If the seals for the sealing of the working space against the piston are to be arranged in a stationary manner, it is also advantageous to provide the piston with a circumferential cover between the shaft and the piston heads onto which the seals can circumferentially engage.

In a preferred design of the machine according to the invention as a prime mover, inlet and outlet slots are arranged in the cylinder housing and in the piston and connected to them in selected moving phases, are piston channels leading to the combustion chamber for feeding in a fuel-air mixture and for exhausting combustion gases. Control mechanisms such as cams, controls for the valves or the like are not required. The piston channels advantageously extend from the circumference of the piston to the center of the frontal area of the piston whereby the frontal area of the piston is conically sunk towards the channel opening and the opposite front wall of the combustion chamber is protruding in a fitting manner. A uniform intake and exhaust of the combustion chambers in the fastest way is made possible by means of such an arrangement and shaping of the piston channels.

BRIEF DESCRIPTION OF THE DRAWINGS

The drawing shows in several advantageous examples of the design of the invention.

DETAILED DESCRIPTION OF A PREFERRED EMBODIMENT

Figure 1:
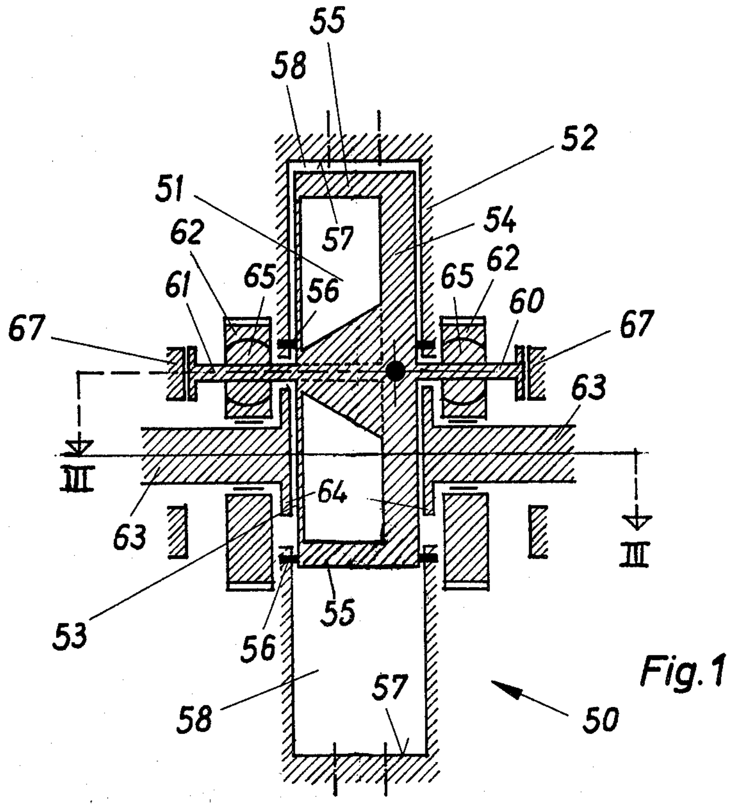
FIG. 1 shows a schematic representation of a design of the piston type generating machine according to the invention in longitudinal cross-section.
Figure 3:
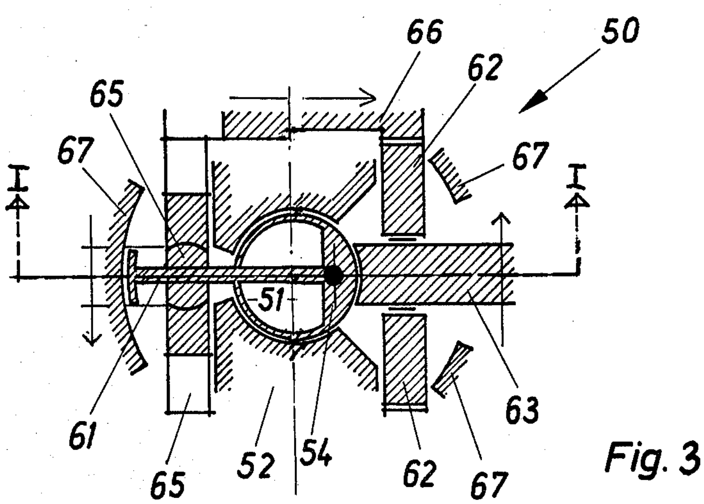
FIG. 3 shows a schematic cross-section of the first design according to the cross-section III—III of FIG. 1.
Figure 2:
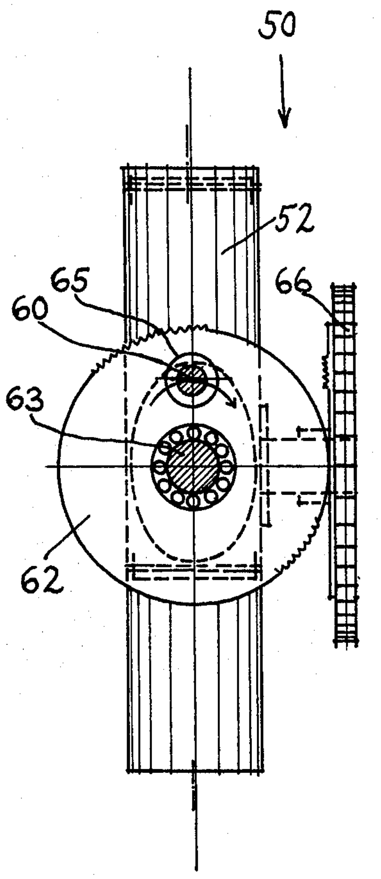
FIG. 2 shows a schematic representation of the design of FIG. 1 in a side view turned 90° to the view of FIG. 1.

FIGS. 1–3 show the first embodiment 50 of a piston-internal combustion engine according to the invention. In this design, the piston 51 is arranged in such a manner that its center of gravity lies outside the longitudinal center axis. Piston 51 of embodiment 50 has a shaft part 54, the outer circumference of which is cylindrical, but inwardly hollow, and one wall of which is thickened. The enclosed circumferential form of the shaft part 54 of piston 51 permits a stationary arrangement of the sealing rings 56 for sealing-off the combustion chambers 58 on the inside wall of the combustion chamber housing 52. The sealing rings 56 are arranged so that they lie against the piston 51 in its outer dead center positions in the area of the pistion heads 55.

As best seen in FIG. 3, in the space 53 overlapped by the piston 51, lying between the combustion chambers 58, the combustion chamber housing 52 has radial openings toward the outside. In this space, 53, the piston arms 60, 61 pass through the combustion chamber housing 52, on the outer side of which the output gears 62 are mounted. Axles 63 serve to mount the output gears 62, which in the represented example design are arranged outside of the combustion chamber housing 52 and have flange-like extensions in the area of the chamber 53 which coincide with the plane of the wall of the combustion chamber housing 52. The piston arms 60, 61 pass through joint parts 65 arranged in the output gears 62 in a sliding manner so that they are rotatable as well as movable with respect to the output gears 62. As is shown in more detail in FIG. 2, the output gears 62 interact with a gear wheel 66 transversely arranged between them and to which they impart their rotational movement. It should also be added that the output gears 62 as well as the gear wheel 66 are preferably designed as toothed gear wheels. In addition, it is also to be mentioned that with embodiment 50, the piston arms 60, 61 are supported with their ends on a sliding guide 67 in the radial direction of the piston, so that it is freely movable within the combustion chamber housing 52.

When operating the piston-internal combustion engine 50, the combustion chambers 58 are supplied with a fuel-air mixture by means of valves preferably provided in the area of the front walls 57 of the combustion chamber housing, 52, but which are not represented in more detail. By means of the alternate combustion of an air-fuel mixture in both combustion chambers 58, piston 51 is loaded in the direction of its longitudinal axis. By means of the connection of its piston arms 60, 61 with the output gears 62, however, the piston cannot execute a purely longitudinal movement. Rather, a pendulous rotation is imparted to it around its longitudinal central axis as a function of the longitudinal movement, by means of which the output gears 62 are rotated in the opposite direction. On the basis of the longitudinally moving engagement of the piston arms 60, 61 into the pivoting parts 65 of the output gears 62, the combined stroke-rotational movement of the piston can be transmitted to the output gears 62 which are only rotatable in single plane. The further output is effected via the common gear wheel 66 provided between both output gears 62.

Figure 4:
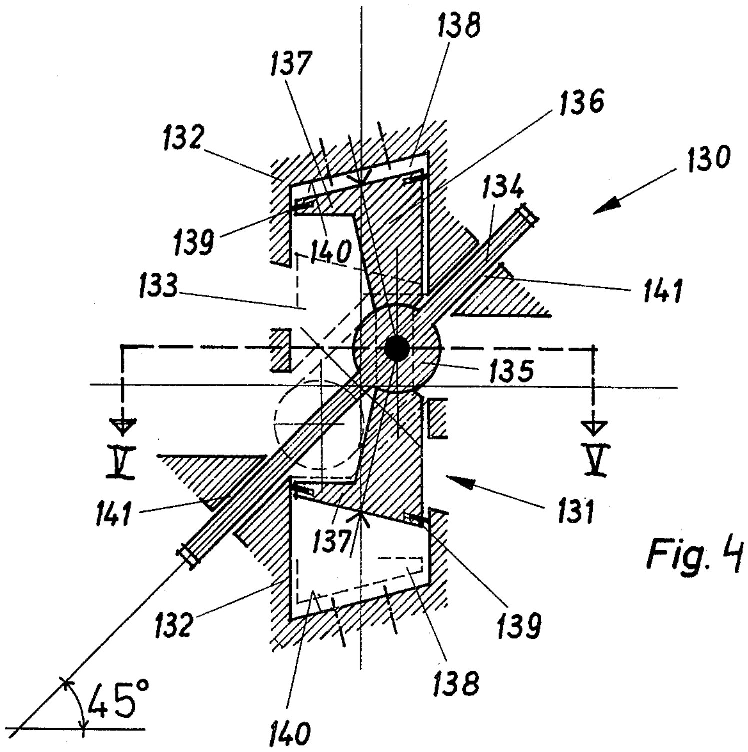
FIG. 4 shows a schematic representation of a second design of the machine according to the invention in longitudinal cross-section.
Figure 5:
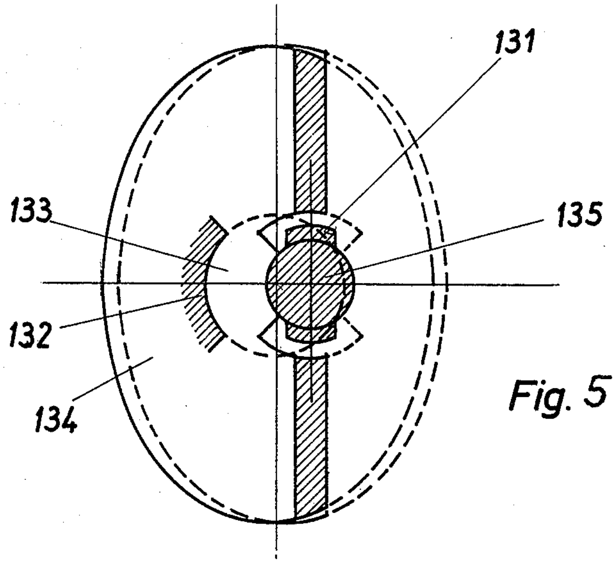
FIG. 5 shows the second design according to the cross-section V—V of FIG. 4.

FIGS. 4 and 5 show a second design 130 of the piston-internal combustion engine according to the invention, wherein the combustion chamber housing 132 is penetrated by a gear wheel 134 arranged at an inclination of, e.g. 45° to the longitudinal axis of the space 133 enclosed by the combustion chamber housing. Gear wheel 134 is eccentrically mounted on a joint 135 provided within the piston 131 so that a pivotable movement is possible. The piston 131 in turn has an eccentric shaft 136, on both ends of which the piston heads 137 are adjacent, whose outer front surfaces are turned toward the combustion chambers 138. To seal off the combustion chambers 138, the piston heads 137 are provided with sealing rings 139. In the case of the shape of piston 131 selected for design 130, the front piston walls as well as the front walls 140 of the combustion chambers are designed inclined with respect to the main axis, whereby the piston front walls are inclined in opposite directions and the combustion chamber front walls 140 are inclined in the same direction.

It should also be added that gear wheel 134 is forcibly guided in the guide slots 141, so that its movement path is determined thereby and only a displacement in the plane of the guide slot 141 is possible. With the action upon the front walls of the piston, by means of the fuel-air mixture burning alternately in one of the combustion chambers 138, a combined stroke-rotational movement is imparted to piston 131 in synchronization with the gear wheel 134. The center of gravity, lying in this design centrally in the joint 135, describes an elliptical path, whereby the ratio of ellipsis axes A:B are approximately equal to $1:\sqrt{2}$. Weights, counteracting the piston centrifugal force, may be built into the gear wheel itself. The displacement of the gear wheel in the plane of the guide slot can be eliminated when the piston is pivotally mounted in the gear wheel by means of a universal joint.

Figure 6:
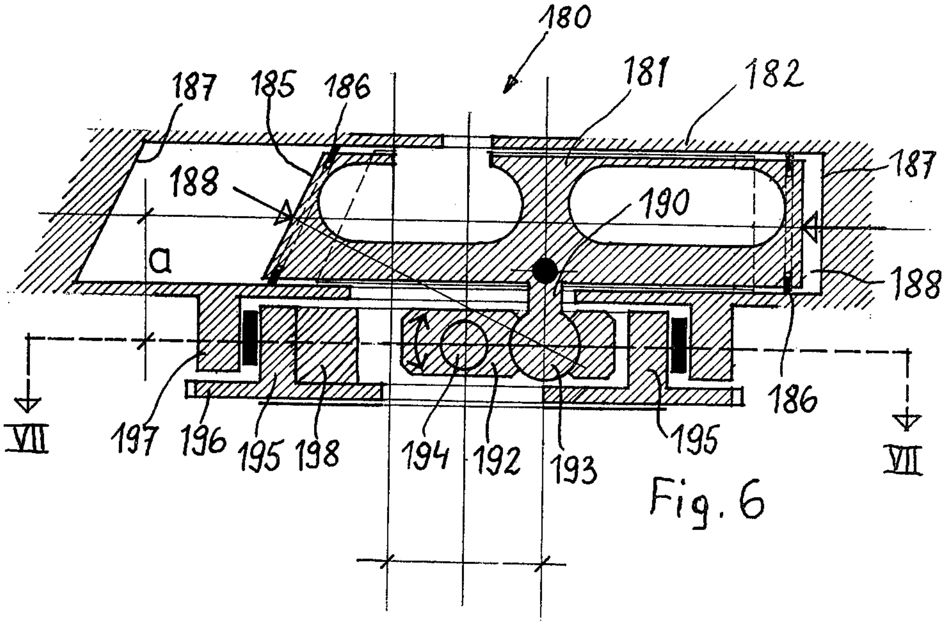
FIG. 6 shows a third design of the machine according to the invention in longitudinal cross section and FIG. 7 shows a cross-section along the line VII—VII of FIG. 6.
Figure 7:
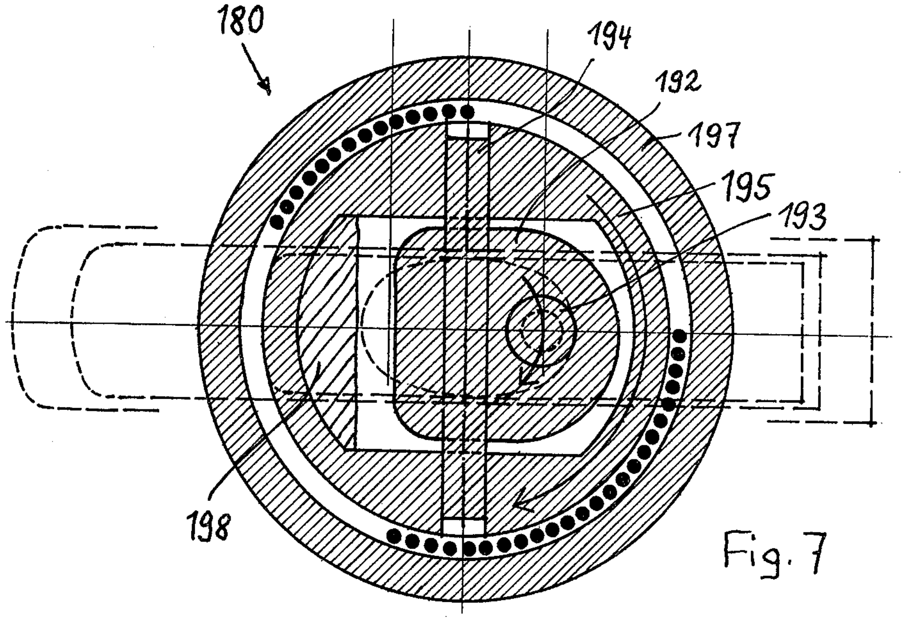

The third embodiment 180 presented in FIGS. 6 and 7 of an internal combustion engine designed according to the invention has a piston 181 with a special shape by means of which the center of gravity is shifted from the center line. This piston 181 is again mounted in a shiftable manner within a combustion chamber housing 182 and is provided with sealing rings 186 in the area of its piston heads 185. In this manner, combustion chambers 188 are formed between the front walls 187 and the piston heads 185 in which a fuel-air mixture is burned and by means of which the piston can be set into motion.

Piston 181 has a radially projecting piston arm 190 which engages over a joint 193 in a swash element 192. In turn, the swash element is mounted on a swash axis 194 which is installed in a collar 195 of output gear 196 and by means of which the piston movement is transmitted to the output gear. The output gear, which is designed to equalize the mass of the entire system having an unequal mass distribution, is at the same time mounted in a bearing 197 with the cylindrical collar 195.

As already mentioned, the presented embodiments are only exemplary realizations of the invention which is not limited to these examples. Thus, the piston machine of the invention can also be equippped for operation with another type of energy, such as for example, steam, pressurized air, or pressurized oil. Also, the machine according to the invention can be used as a pump. In these instances, the designs of the pistons and combustion chambers can differ from the illustrated ones to comply with the actual specific requirements.

I claim:

1. In a piston power generating machine having a housing which encloses a cylindrical working chamber, at least one piston mounted for reciprocating movement along the longitudinal axis of the working chamber, said piston being connected through the housing with an output mechanism, the improvement comprising said piston having a center of gravity eccentric to its longitudinal axis, said piston including a shaft element arranged substantially parallel to and offset from the longitudinal axis of the working chamber and a piston cover at least at one end of said shaft element, said piston cover having a cross-section substantially corresponding to the cross-section of the working chamber and guide means for rotatably mounting said piston about the longitudinal axis of said working chamber and for imparting rotational movement to said piston in response to the reciprocating movement thereof whereby the center of gravity of the piston is laterally spaced a substantial distance from the longitudinal axis of the working chamber.

2. The improvement according to claim 1, wherein said piston comprises at least one output element penetrating the housing of the working chamber.

3. The improvement according to claim 1, including output means arranged exteriorly of said working chamber on an axis of rotation which lies on a transverse center line of the piston stroke path, said piston having piston arms eccentrically connected with said output means.

4. The improvement according to claim 3, wherein said output means comprise toothed output gears rotatable about said axis of rotation, said gears slidably engaging said piston arms along the lengths thereof.

5. The improvement according to claim 4, wherein said output gears are each drivingly connected to a central gear wheel.

6. The improvement according to claim 5, wherein said output gears and said central gear wheel are bevel gears.

7. The improvement according to claim 1, including output means arranged exteriorly of said working chamber on an axis of rotation which lies on a transverse center line of the piston stroke path, said piston having at least one piston arm eccentrically connected with said output means, said output means including a swash plate articulatingly connected to said piston arm.

8. The improvement according to claim 7, wherein said output means further includes an output gear having a collar, bearing means for rotatably mounting said output gear and means for mounting said swash plate to the collar of said output gear.

9. The improvement according to claim 1, wherein said guide means includes an output gear penetrating said working chamber and being rotatably mounted in guide slots arranged at an angle relative to the longitudinal axis of the working chamber, said piston being pivotably connected to said output gear.

10. The improvement according to claim 9, wherein said guide slots are arranged at an angle of about 45° relative to the longitudinal axis of the working chamber.

11. The improvement according to claim 1, wherein said piston comprises a shaft element arranged offset from the longitudinal axis thereof and piston covers at each end of said shaft element, said piston covers having a cross-section corresponding to the cross-section of said working chamber.

12. The improvement according to claim 11, including a circumferential casing arranged about said shaft element and extending between said piston covers.

13. In a piston power generating machine having a housing which encloses a cylindrical working chamber, at least one piston mounted for reciprocating movement along the longitudinal axis of the working chamber, said piston being connected through the housing with an output mechanism, the improvement comprising said piston having a center of gravity eccentric to its longitudinal axis, guide means rotatably mounting said piston about the longitudinal axis of said working chamber and for imparting rotational movement to said piston in response to the reciprocating movement thereof, said guide means including an output gear penetrating said working chamber guide slots arranged at an angle relative to the longitudinal axis of the working chamber and means rotatably mounting said output gear in said guide slots, said piston being pivotably connected to said output gear.

14. The improvement according to claim 13, wherein said guide slots are arranged at an angle of about 45° relative to the longitudinal axis of the working chamber.

* * * * *